April 12, 1932.　　　V. LINK　　　1,853,910
BRAKE OPERATING MECHANISM
Filed Dec. 3, 1926　　2 Sheets-Sheet 1
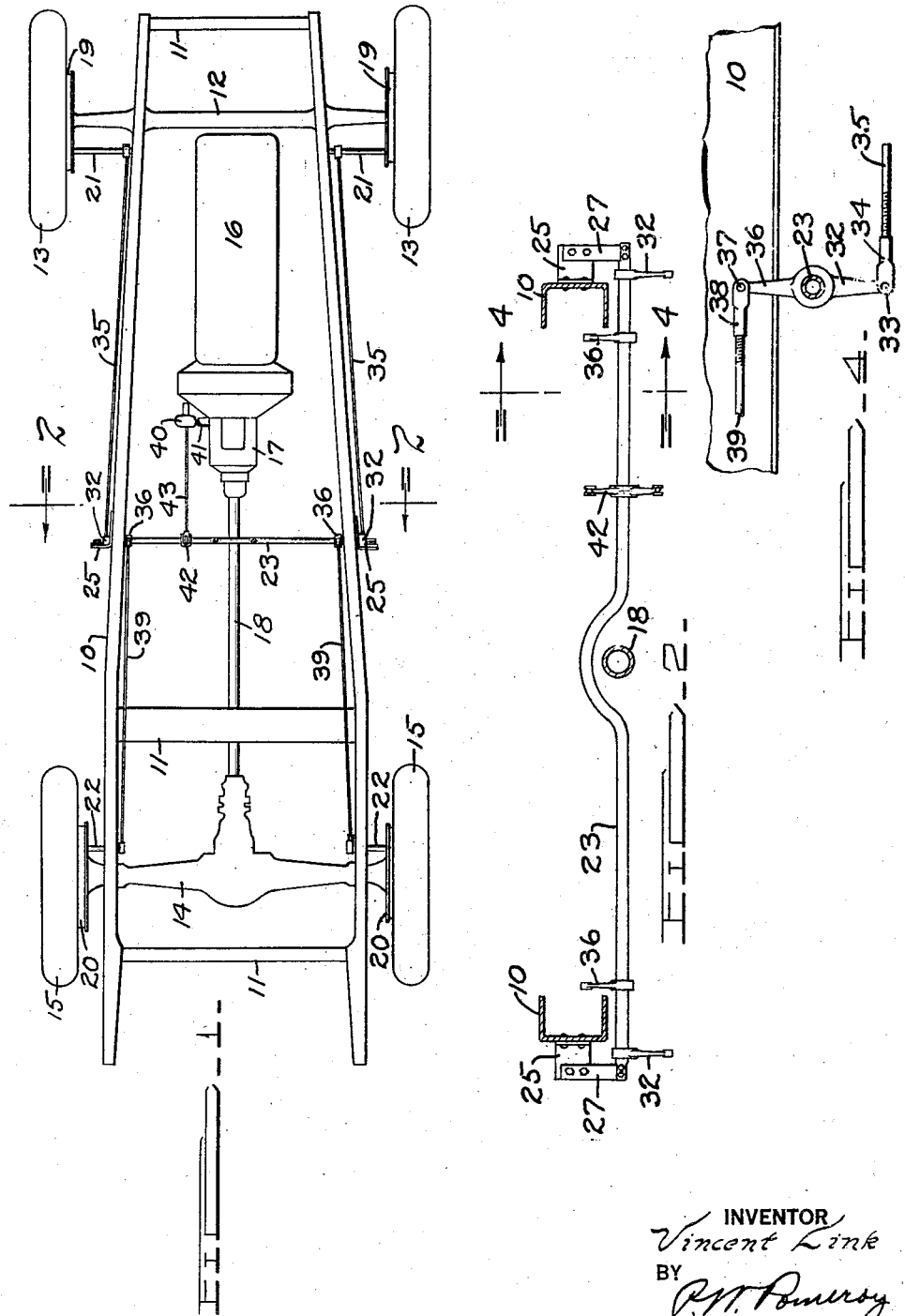
INVENTOR
Vincent Link
BY
P. W. Pomeroy
ATTORNEY April 12, 1932. V. LINK 1,853,910
BRAKE OPERATING MECHANISM
Filed Dec. 3, 1926 2 Sheets-Sheet 2
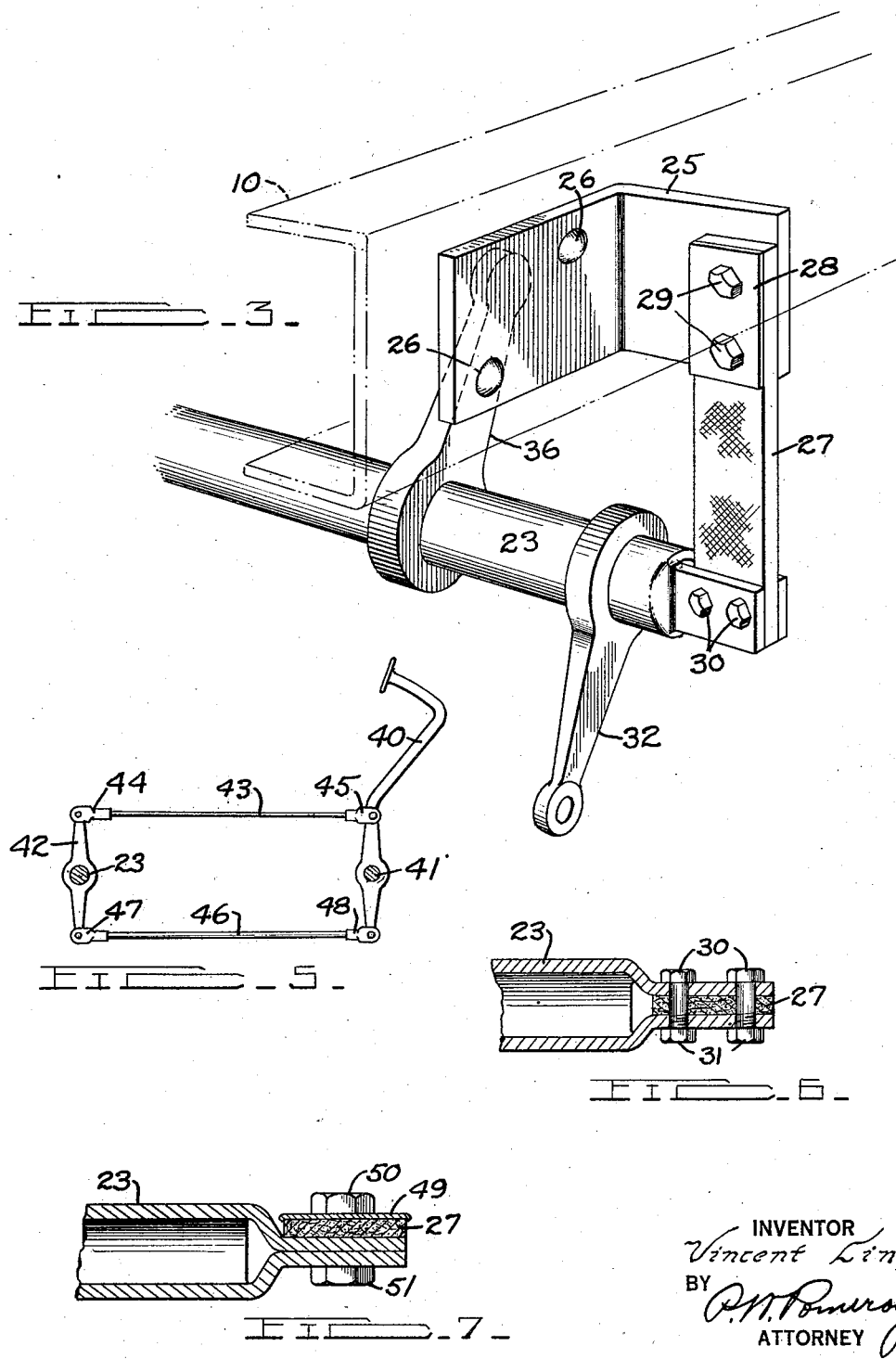

Patented Apr. 12, 1932

1,853,910

UNITED STATES PATENT OFFICE

VINCENT LINK, OF DETROIT, MICHIGAN, ASSIGNOR TO THE STUDEBAKER CORPORATION, OF SOUTH BEND, INDIANA, A CORPORATION OF NEW JERSEY

BRAKE OPERATING MECHANISM

Application filed December 3, 1926. Serial No. 152,456.

This invention relates to motor vehicles and particularly to brakes therefor, the principal object being the provision of novel means for supporting a brake cross shaft whereby the same is both rotatable and bodily shiftable.

Another object is to provide in combination with the braking mechanism of a motor vehicle, a rotatable brake cross shaft supported for bodily movement by a freely flexible means.

Another object is to provide means for supporting the end of a vehicle brake cross shaft whereby the same may have limited movement forwardly and rearwardly of its normal position on said vehicle, comprising a flexible strip of material, one end of which is secured to said cross shaft and the other end of which is supported by the frame of said vehicle.

Another object is to provide a vehicle brake cross shaft which is hung from the frame of the vehicle by freely flexible strips capable of allowing the cross shaft to move bodily longitudinally of the vehicle.

Another object is to provide in a brake mechanism of a motor vehicle, a brake cross shaft supported only at its ends by depending strips of freely flexible material secured at their opposite ends to a fixed support.

Another object is to provide in a motor vehicle having brakes on all four wheels, a brake cross shaft extending transversely of the frame of said vehicle and supported at its ends by depending strips of freely flexible material, said cross shaft being connected by suitable levers and linkages to the brakes on all of the wheels, means being provided for causing a positive rotary movement to be imparted to the brake shaft.

A further object is to provide in a motor vehicle having four wheel brakes, a brake cross shaft supported only at its ends by depending strips of freely flexible material whereby said cross shaft is capable of a limited movement forwardly and rearwardly of its normal position on said vehicle, levers relatively non-rotatably secured to said cross shaft being connected by suitable linkages to said brakes, and a double armed lever secured to said cross shaft being connected to the brake pedal by a pair of linkages positioned on either side of the pivot point of said brake pedal.

The above being among the objects of the present invention the same consists in certain features of construction and combinations of parts to be hereinafter described with reference to the accompanying drawings, and then claimed, having the above and other objects in view.

In the accompanying drawings which illustrate a suitable embodiment of the present invention, and in which like numerals refer to like parts throughout several different views, Figure 1 is a diagrammatic plan view of a motor vehicle chassis in which an embodiment of the present invention is incorporated.

Figure 2 is a sectional view taken on the line 2—2 of Figure 1.

Figure 3 is a fragmentary perspective view showing the manner of supporting the end of the cross shaft.

Figure 4 is a sectional view taken on the line 4—4 of Figure 2.

Figure 5 is a side view showing the manner in which the brake cross shaft is connected to the brake pedal for relative movement therewith.

Figure 6 is a fragmentary sectional view taken horizontally through the end of the brake cross shaft, showing the manner of securing the flexible supporting strip thereto.

Figure 7 is a view similar to Figure 6 illustrating a modified manner of securing the flexible strip to the end of the brake cross shaft.

The chassis shown in Figure 1 comprises frame side members 10, frame cross members 11, front axle 12, front wheels 13, rear axle 14 and rear wheels 15. The engine 16 is connected to the rear axle 14 through the conventional transmission 17 and propeller shaft 18. Each front wheel 13 is provided with a brake drum 19 and each rear wheel 15 is provided with a similar brake drum 20. The brakes shown for the purpose of illustration may be considered as of the conventional internal expanding type, operated by rotating the shaft 21 at the front wheels and the shaft 22 at the rear wheels. Extending transversely of the vehicle, just rearwardly of the transmission 17, is a brake cross shaft 23 supported in the manner as best shown in Figures 2 and 3. An L-shaped bracket 25 is secured to each frame side member 10 directly above the end of the cross shaft 23, one leg of this bracket 25 being secured to the frame side member 10 by rivets 26 or other suitable means, and the other leg thereof projecting outwardly from the frame side member 10. A strip of fabric 27, preferably of the rubber impregnated type, is secured to the outwardly projecting portion of each bracket 25 by means of a metal plate 28 and screws 29. The lower end of the strip 27 which projects downwardly from the bracket 25 is secured to the end of the cross shaft 23. In the particular embodiment of the cross shaft 23 shown, the same is of tubular material and diametrically opposite portions of each end thereof are removed and the sides flattened and brought into adjacent relationship to form a yoke end. The lower ends of the strips 27 are received between the yoke ends of the cross shaft 23 and screws 30 are passed through the yoke ends and the fabric 27, and such ends are drawn together to clamp the fabric therebetween by nuts 31 threaded on the screws 30. It will thus be seen that the cross shaft 23 is supported solely by the strips 27 which, being flexible, will allow the shaft to swing a limited amount longitudinally of the vehicle.

Secured adjacent the outer end of the cross shaft 23 are downwardly extending levers 32, the free ends of which (see Figure 4) are connected by means of the pins 33 and clevises 34 to the brake rods 35 which extend forwardly and are pivotally connected to the front brake operating shafts 21. Secured to each end of the shaft 23, just inside of the frame member 10, are upwardly extending levers 36, the free ends of which are connected by means of the pins 37 and clevises 38 to the brake rods 39 which extend rearwardly therefrom and are pivotally connected to the brake operating shafts 22 for the rear wheel brakes.

A foot pedal 40 is suitably mounted on a shaft 41 which may be supported by the transmission case 17. Secured to the shaft 23 in longitudinal line with the foot pedal 40 is a double armed lever 42, the arms thereof projecting upwardly and downwardly therefrom. The upwardly extending arm of the lever 42 is pivotally connected to the foot pedal 40 above its pivot support by means of a link 43 and clevises 44 and 45. The lower end of the lower arm or lever 42 is pivotally connected to the lower end of the foot pedal 40 below its pivot point by means of a link 46 and clevises 47 and 48. The shaft 41 for the foot pedal 40, being immovably secured to the transmission or other suitable support, it will be apparent that the links 43 and 46 hold the shaft 23, at the point where the lever 42 is secured thereto, at a definite fixed distance from the shaft 41. When the pedal 40 is depressed the link 43 draws the upper end of the lever 42 forward and the link 46 pushes the lower end of the lever 42 rearwardly, thus imparting a positive rotary motion to the shaft 23. When this rotary motion is transmitted to the shaft 23, the lower ends of the levers 32 move rearwardly, drawing the brake rods 35 rearwardly therewith and cause the front wheel brakes to be applied. At the same time the upper ends of the levers 36 are caused to move forwardly carrying the brake rods 39 forwardly therewith and causing rotation of the rear brake operating shafts 22 and consequently application of the rear brakes. Suitable spring means (not shown) may be employed for returning the mechanism to its normal or inoperative condition when pressure on the foot pedal 40 is released.

Inasmuch as the shaft 23 is held against movement longitudinally of the vehicle by the links 43 and 46 at the point where the lever 42 is secured thereto, it will be apparent that the shaft 23 has a pivotal movement in a horizontal plane about this point. In other words, its ends are unrestrained against a limited movement longitudinally of the vehicle. For this reason should one of the brakes on one side of the vehicle be applied before the other brake on the same side of the vehicle, the shaft 23 will have sufficient pivotal movement to allow the end thereof to move forwardly or rearwardly from its central position to equalize the pressure between the two brakes. In the same manner if the rear brakes should be applied before the front wheel brakes, the shaft 23 may pivot sufficiently to allow the ends thereof to move rearwardly and equalize the pressure between the front wheel brakes and the rear wheel brakes. Consequently, due to this flexible nature of the construction, substantially perfect equalization may be had within limited bounds between all brakes.

The pivotal movement of the shaft 23 is made possible because the links 43 and 46 may bend slightly and besides there is sufficient clearance between the pivot pins and the clevises connected at the ends of the links 43 and 46 to permit this movement. As the forward and rearward movement of the ends of the shaft 23 does not effect movement of the central portion of the shaft to an appreciable extent, it has been found in practice that any pivotal movement of the shaft 23 does not cause binding of the operating parts thereof.

In order to procure perfect equalization by this manner, the shaft 23 should be so constructed that one end thereof will deflect the same amount as the other end thereof under a given pressure applied to the lever 42. Should the brake be so adjusted that the deflection of the shaft 23 is insufficient to procure equalization, the brakes may be adjusted for equal application by adjusting the position of the clevises 34 or 38 on the rods 35 or 39 respectively, by threading the same forwardly or rearwardly thereon. When it is desired to take up the wear on all of the brakes, the same may be accomplished by adjusting the length of the links 43 and 46, by adjusting the position of the clevises 34 and 38 on the rods 35 and 39 respectively, or by independent means (not shown) carried by the brake mechanism at each wheel. It will be apparent that the easiest method will be to vary the length of the links 43 and 46 by threadedly adjusting the position of the clevises 44 or 45 and 47 and 48 respectively thereon.

In Figure 7 is illustrated a slightly modified manner of securing the cross shaft 23 to the flexible strip 27. In this modification the end portions of the shaft 23 are bent into direct contact with each other and the lower end of the strip 27 is secured thereagainst by a metal plate 49, a bolt 50 and nut 51.

From the above description it will be apparent that the construction described provides a very simple and economical manufacturing proposition. It will be observed that a minimum of parts are used and that absolutely no bearings are required for the brake cross shaft 23, which not only saves expense but provides a construction which does not need to be lubricated and is therefore advantageous from the owner's point of view.

Formal changes may be made in the specific embodiment of the invention described without departing from the spirit and substance of the broad invention, the scope of which is commensurate with the appended claims.

What I claim is:

1. In a braking mechanism for a motor vehicle, a strip of fabric depending from the frame of said vehicle, a brake cross shaft secured adjacent to its end to the lower end of said strip whereby said end may move longitudinally of said vehicle, and means intermediate the ends of said shaft for holding the central portion thereof in fixed longitudinal position relative to the vehicle.

2. In a motor vehicle a brake cross shaft pivotable about a point between its ends in the normal operation of applying the brakes of said vehicle, and means for allowing bodily shiftable movement of said cross shaft in the operation of adjusting said brakes.

3. In a motor vehicle, a brake cross shaft mounted on freely flexible strips adjacent to its ends, and means causing said cross shaft to have pivotal movement about a point between its ends.

4. In a braking mechanism for a motor vehicle, a brake cross shaft suspended adjacent to its ends by flexible members, a double lever mounted on said shaft between its ends, a brake pedal, and connections from said lever to said pedal above and below the pivotal point thereof.

5. In a motor vehicle, a brake cross shaft suspended solely by flexible members adjacent its ends, a double armed lever secured to said shaft between its ends, a brake pedal pivoted between its ends, and links connecting the free ends of said lever to said brake pedal above and below the pivotal point thereof.

6. In a motor vehicle having four wheel brakes, a brake cross shaft suspended wholly by flexible nonmetallic members adjacent its ends, connections between said shaft and all of said brakes, and linkages connecting said shaft above and below the axis thereof to a foot pedal for imparting positive rotary movement to said shaft.

7. In a brake mechanism of a motor vehicle, a manually operable member, a brake cross shaft, means connecting said member and shaft whereby said shaft has pivotal movement on said means, and flexible nonmetallic means supporting said shaft and permitting movement of one end of said shaft relative to its opposite end.

8. In a motor vehicle, a brake cross shaft mounted on flexible strips adjacent to its ends, the broad face of each of said strips being parallel with the axis of said shaft to permit bodily shiftable movement of said shaft longitudinally of said vehicle, and means intermediate the ends of said cross shaft to cause pivotal movement thereof in the operation of applying the brakes of said vehicle.

9. In a motor vehicle, a brake cross shaft mounted on the depending ends of flexible strips adjacent to its ends, the broad faces of each of said strips being parallel with the axis of said shaft to permit bodily shiftable movement of said shaft longitudinally of said vehicle, and means intermediate the ends of said shaft for holding the central portion thereof in fixed longitudinal position relative to the vehicle.

10. In a motor vehicle, a brake cross shaft formed with spaced members at each end thereof, means for supporting said shaft to permit bodily shiftable movement thereof comprising flexible strips secured between said spaced members, and operating means for said cross shaft permitting said cross shaft to have pivotal movement about a point between its ends.

11. In a motor vehicle, a brake cross shaft formed with yoke ends, means for supporting said shaft to permit bodily shiftable movement thereof comprising flexible strips having their broad faces secured in said yoke ends, and operating means for said cross shaft permitting said cross shaft to have pivotal movement about a point between its ends.

12. In a motor vehicle, a brake cross shaft mounted to permit bodily movement of either end thereof transversely of its length, and means intermediate the ends of said shaft for maintaining a portion of said shaft in fixed longitudinal position relative to said vehicle.

Signed by me at Detroit, Michigan, this 29 day of November 1926.

VINCENT LINK.